United States Patent [19]
Daniels

[11] 3,979,984
[45] Sept. 14, 1976

[54] CONTOURING APPARATUS
[75] Inventor: Dennis Daniels, Bellevue, Wash.
[73] Assignee: U.S. Amada, Ltd., City of Industry, Calif.
[22] Filed: Nov. 14, 1974
[21] Appl. No.: 523,667

Related U.S. Application Data
[60] Division of Ser. No. 386,064, Aug. 6, 1973, which is a continuation-in-part of Ser. No. 359,983, May 14, 1973.

[52] U.S. Cl. .................................. 83/410; 83/402; 83/420
[51] Int. Cl.² ........................................ B27B 13/04
[58] Field of Search ................ 83/820, 410, 411 R, 83/794, 801, 402

[56] References Cited
UNITED STATES PATENTS

| | | | |
|---|---|---|---|
| 2,296,967 | 9/1942 | Wilkie | 83/410 X |
| 2,843,917 | 7/1958 | Crane et al. | 83/820 X |
| 3,196,910 | 7/1965 | Hawkins | 83/801 |
| 3,259,155 | 7/1966 | Kawabata | 83/820 X |
| 3,733,952 | 5/1973 | Fukugami et al. | 83/820 X |

Primary Examiner—Othell M. Simpson
Assistant Examiner—Z. R. Bilinsky
Attorney, Agent, or Firm—Seed, Berry, Vernon & Baynham

[57] ABSTRACT

A band saw is provided with rotary guides for changing the angle of the saw. While the part is rotated and linearly translated toward and away from the saw by the contouring apparatus, the saw cuts a peripheral shape on the part with the blade changing its angular attitude where necessary. An air cushion support holds the edge of the part at the saw blade.

After cutting, the contouring turret is rotated another 90° bringing the part to a deburring station. The motion of the part at the deburring and cutting stations is identical for simultaneous cutting and deburring. Next the turret is rotated another 90° and the deburred part is engaged by a second transfer arm to remove the part and locate it for subsequent treatment.

11 Claims, 15 Drawing Figures

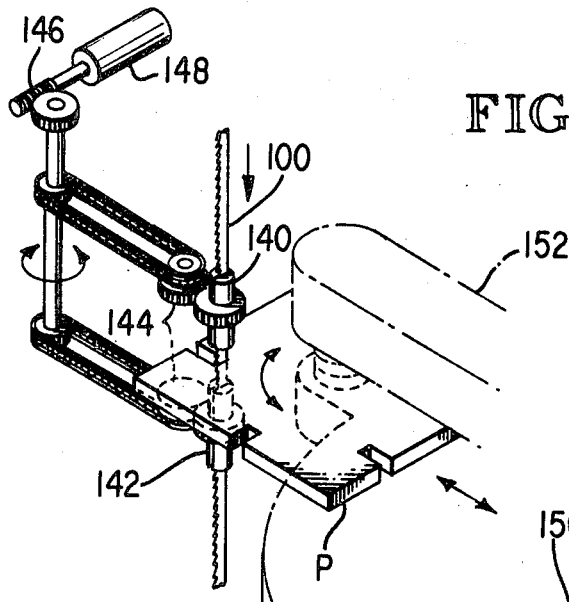
FIG. 12
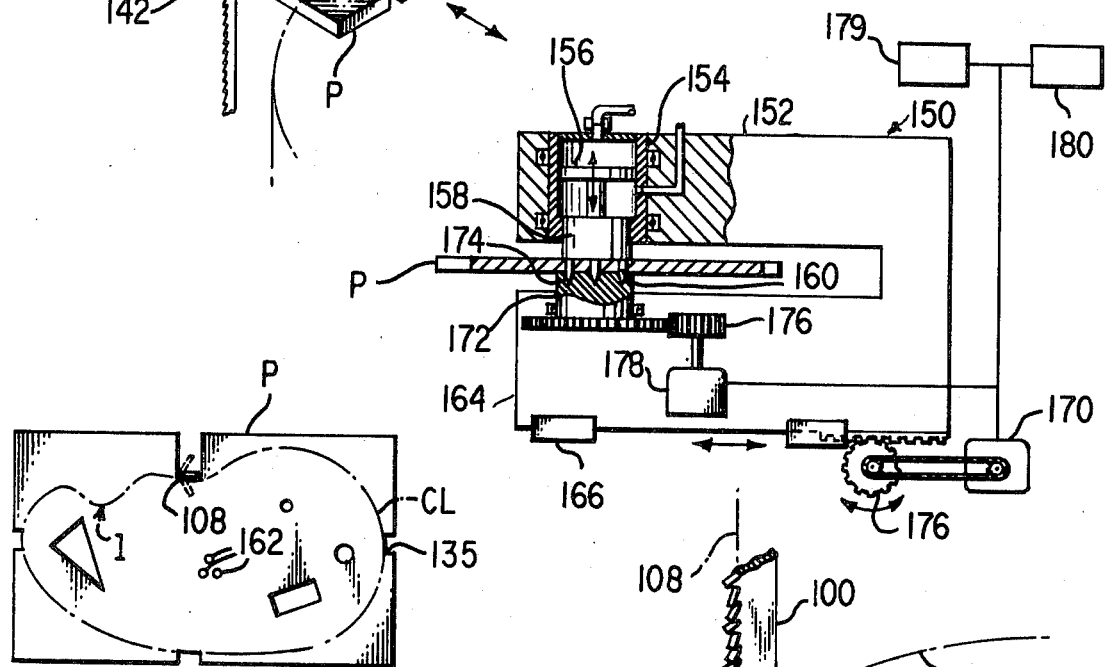
FIG. 13
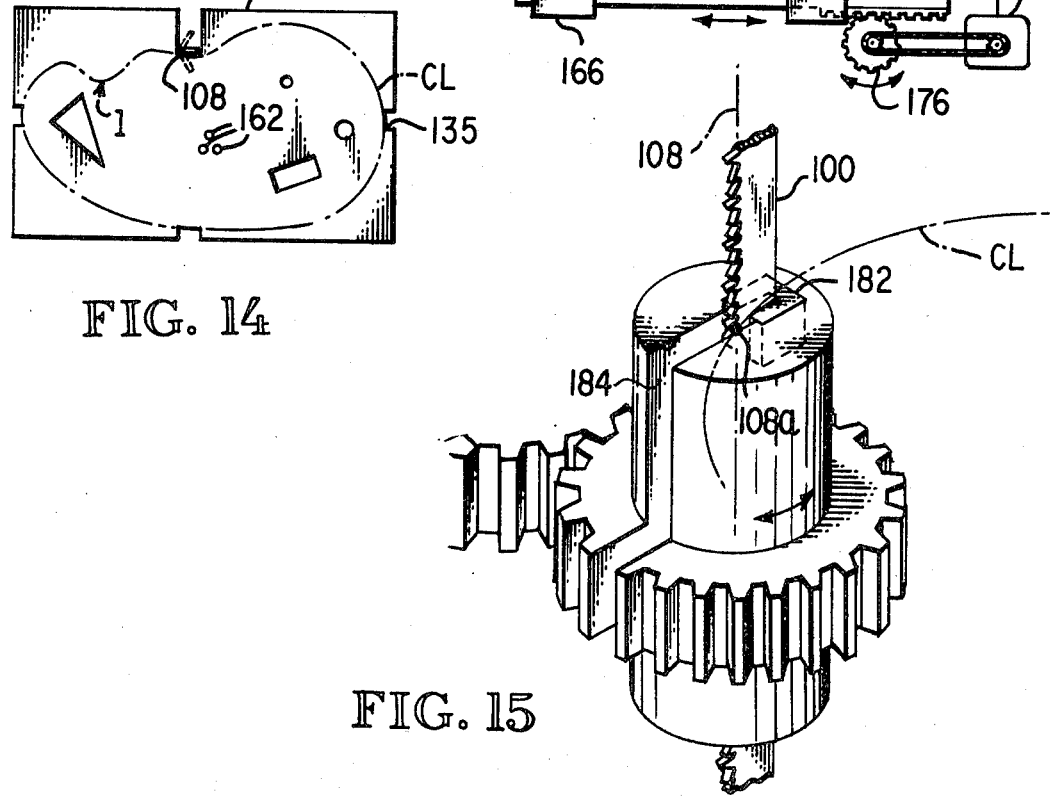
FIG. 14
FIG. 15

CONTOURING APPARATUS

CROSS-REFERENCE TO RELATED APPLICATIONS

This is a divisional of Ser. No. 386,064 filed Aug. 6, 1973, which is a continuation-in-part of Ser. No. 359,983, filed May 14, 1973.

BACKGROUND OF THE INVENTION

1. Field of the Invention

This invention pertains to sheet material contouring apparatus. The sheet material is of the self shape-sustaining type such as plastic, wood or metal.

2. Description of the Prior Art

In many industries particularly the aerospace industry, there is a need for the mechanized production of a relatively few irregularly shaped sheet material parts. For example, only two and three hundred such parts may be needed in a year. Presently these parts are made by first cutting a templet and then either by hand or with limited machinery cutting the shape of the templet in the sheet material. After the part is cut, a considerable amount of manual deburring of the cut edge is required with still more surface finishing following. The cost of such individual parts is quite high and since a particular industry may need as many as two or three thousand different shaped parts manufactured in this way, the ultimate cost is considerable.

There is therefore a need in the sheet material handling and fabricating industry for an apparatus or method to mechanize the production of a large variety of relatively few parts of sheet material. While the numerically controlled punch press is a useful tool for satisfactorily fabricating holes or the like internally in the part it is not satisfactory for cutting the peripheral shape of such irregularly shaped parts, and thus cannot fully satisfy the need for full mechanization.

SUMMARY OF THE INVENTION

It is an object of this invention to provide a contouring apparatus for cutting a peripheral shape on a part.

It is another object of the invention to provide apparatus for rotating and linearly translating sheet material.

It is another object of this invention to provide a cutting and sheet handling device which can change blade attitude, rotate the part and linearly translate the part to cut the peripheral shape of the part.

It is another object of this invention to provide an air cushion support for the outer edge of a sheet material part around a cutter.

The term automatic used throughout this application means not only programmed control wherein the program is recorded either on cards, tapes or in a larger general or special purpose computer, but the term also means manual remote control in which an operator is manually actuating the controls from a remote console. The invention is best utilized in the fully computerized automatic mode however.

A feature of the invention includes a rotary chuck that can linearly translate and rotate a part relative to a cutting tool. In the preferred embodiment, the cutting tool is a planar member such as a band saw blade and a further inventive feature is the unique combination of simultaneous angular attitude control of the blade combined with the rotation and linear translation of the part. It should be understood however, that other cutting tools such as slicers, lasers, routers, etc., can be used in conjunction with the rotary chuck capability of simultaneous linear translation and rotation.

Another inventive feature is the provision of apparatus to support the part at the cutting station in close proximity to the cutting blade or other surface cutting or finishing tool by an air cushion which allows free frictionless translation of the part for positioning it relative to the blade and also dampens vibrations of the part during the cutting operation. In the preferred embodiment, the air cushion is provided below and above the part with an additional pneumatic mechanism for lowering and retracting the upper half of the air cushion device to allow insertion of the part and provide control of the air acting on the part.

BRIEF DESCRIPTION OF THE FIGURES OF THE DRAWING

FIG. 12 is a schematic isometric of a modified form of cutting apparatus usable with the apparatus shown in FIG. 1.

FIG. 13 is a schematic side elevation of a modified form of contouring apparatus.

FIG. 14 is a second example of a typical part that can be made with the apparatus of the preferred embodiment or the modified embodiment shown in FIGS. 12 and 13.

FIG. 15 is a fragmentary schematic of a portion of the apparatus shown in FIG. 12.

DETAILED DESCRIPTION OF THE PREFERRED EMBODIMENTS

Contouring Apparatus

Figure 1:
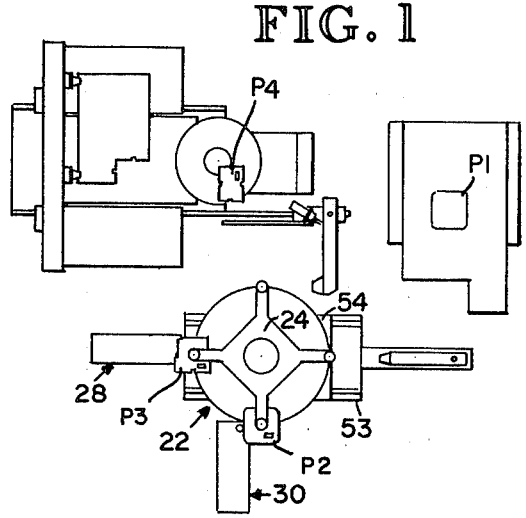
FIG. 1 is a schematic plan illustrating a preferred system utilizing the principles of the invention.
Figure 2:
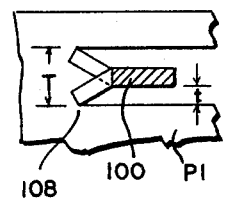
FIG. 2 is a schematic horizontal section of a band saw blade used in the apparatus in FIG. 1.
Figure 5:
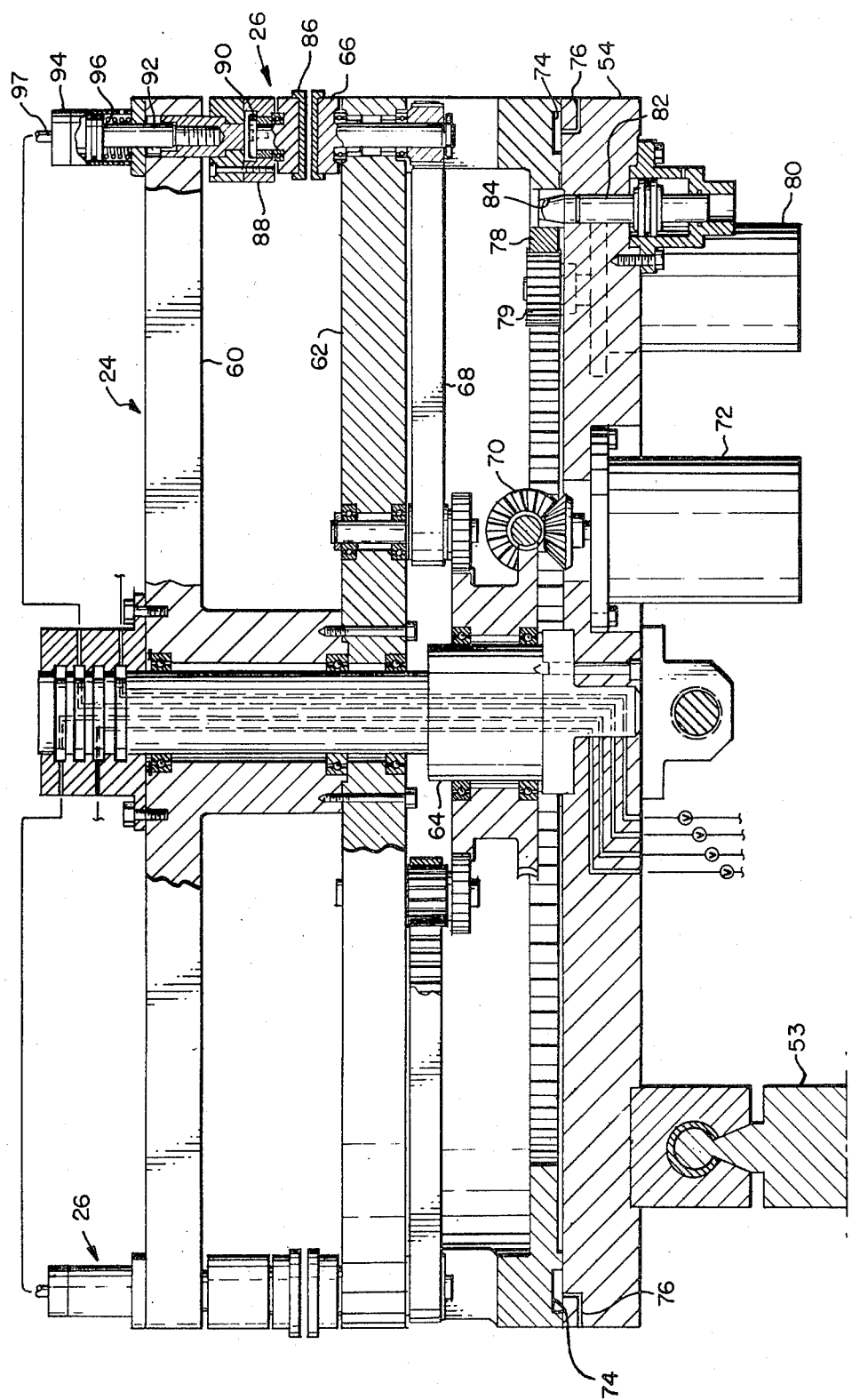
FIG. 5 is a vertical section axially through the contouring apparatus shown in FIG. 1.
Figure 6:
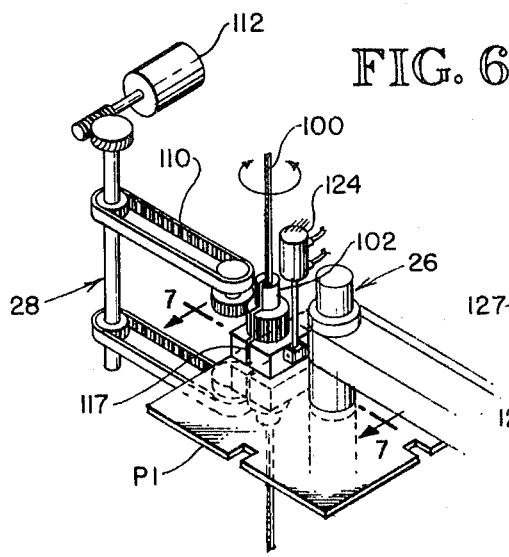
FIG. 6 is a schematic isometric of a portion of the cutting apparatus shown in the apparatus of FIG. 1.

The contouring apparatus 22 is generally shown in FIGS. 1 and 5. The apparatus comprises a base 53 on which is mounted a movable carriage 54. The carriage 54 slides on rails 56 in a direction parallel to the Y axis of the punch press. It should be understood at this point that the movable direction of the carriage 54 need not be parallel to the Y axis of the punch press but rather can be any direction which avoids interference with operation of the punch press. The carriage is moved by a conventional worm drive powered by a motor 58. The turret 24 is rotatably mounted on the movable carriage 54 and includes a spider or set of upper arms 60 and a disk 62. The arms 60 and disk 62 are rotatably mounted on a fixed hollow shaft 64. Mounted in the disk 62 are four rotatable plates 66 which are connected by belt drives 68 and interconnected gearing 70 to a motor 72. Rotation of the output shaft of the motor 72 will rotate all four plates 66 simultaneously.

The disk 62 is supported on the movable carriage 54 by an air cushion chamber 74 using conventional techniques and which is pressurized through a port 76 in the movable carriage 54. The disk 62 is also provided with a circumferential ring gear 78 that is driven by a pinion 79 and a motor 80. Accurate positioning of the disk 62 relative to the carriage 54 is provided by a conventional pneumatically actuated shot pin 82 and conical aperture 84. When the shot pin 82 is retracted, the motor 80 can be driven to rotate the disk 62 and upper arms 60 in 90° increments about the shaft 64. By holding the motor 72 de-energized, the gear 70 will be locked, thus simultaneously causing the belts 68 to rotate thus rotating the plates 66 of each of the chucks 26. It is a unique feature of this invention that the gear ratio between the gearing 70 and the pinion and ring gear 79 and 78, respectively, is such that upon 90° rotation of the turret 24, the chucks 26 will have been rotated in the opposite direction to maintain the same orientation of the parts in the chucks in each of the stations. It is, of course, apparent, that the turret can be rotated and later the chucks can independently be rotated to re-establish a desired orientation of the parts. The interconnected gearing with proper gear ratio, however, does provide this orientation automatically and in a single mechanically interlocked manner.

The upper arms 60 each carry an upper portion of the chuck 26 which likewise is rotatable. Although various arrangements will be satisfactory, the preferred form provides a movable plate 86 rotatably mounted in a retainer block 88. A removable retainer clip 90 holds the movable member 86 in the retainer block 88. The retainer block 88 is movable vertically a sufficient distance to allow placement of a part between the two movable plates 86 and 66. To clamp the part between the plates, a piston rod 92 is threadibly secured to the retainer block 88 and is slidably positioned in the upper arm 60. The piston of the piston rod 92 is slidably held in a cylinder 94 and is spring biased upwardly by a spring 96. Air introduced through a line 97 will move the piston rod downwardly, thus clamping a part P between the movable plates 86 and 66. De-energization of the air pressure will allow the spring 96 to raise the movable plate 86 thus releasing the part. Air is brought in separately to each of the rotary chucks 26, since at some stations the part will remain clamped between the movable plates 86 and 66 while at the receiving and discharging stations of the rotary turret 24, the part may be inserted and released.

It is thus readily apparent that the contouring apparatus 22 provides a means for linearly translating a part while simultaneously rotating the part. Obviously, such mechanism has utility in various types of sheet metal or other sheet material fabricating machines. It is especially useful in a periphery cutting operation which will now be described.

Blade Angle Attitude

Figure 7:
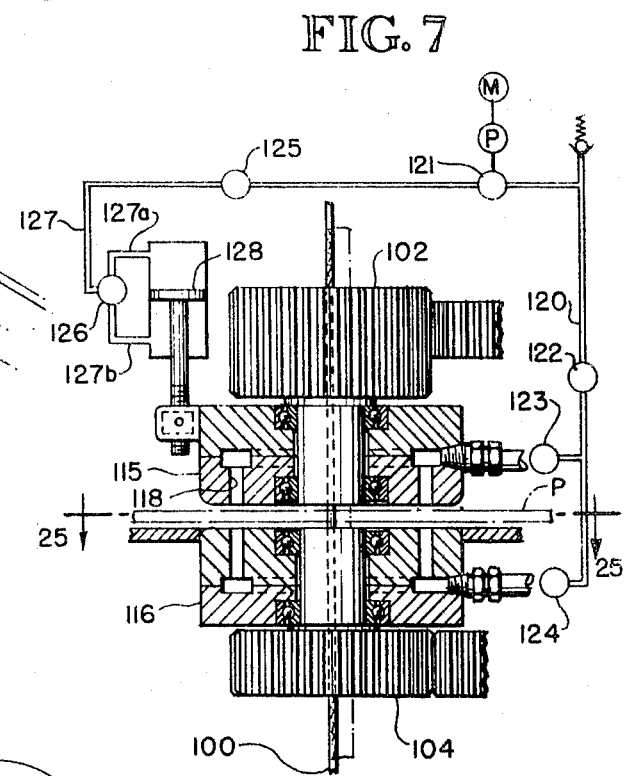
FIG. 7 is a vertical section taken along the arrows 7—7 of FIG. 6.
Figure 8:
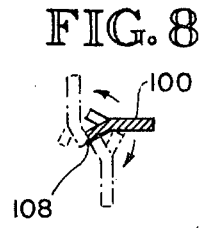
FIG. 8 is a schematic horizontal section taken through the blade of the cutting tool shown in FIG. 12.
Figure 9:
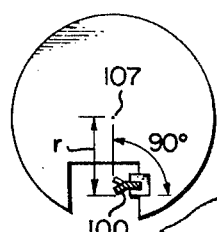
FIG. 9 is a schematic horizontal section taken through the blade shown in FIG. 6.
Figure 10:
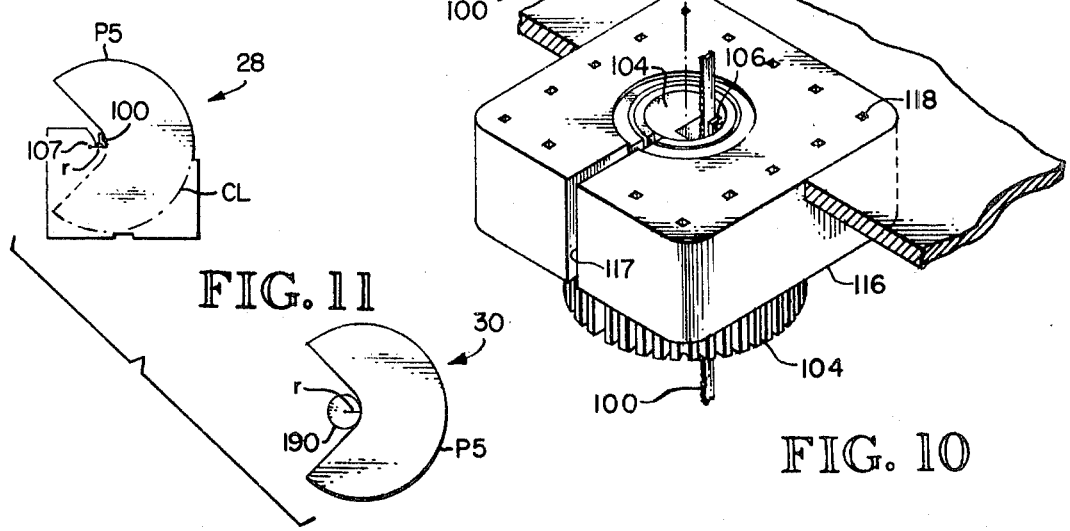
FIG. 10 is a fragmentary isometric of a portion of the blade guiding and air cushion supporting apparatus shown in FIG. 7.

The basic principles of the cutting operation are described in my earlier filed patent applications Ser. Nos. 359,983 and 386,064. Similarly, details of those descriptions are incorporated herein by reference to the applications. In the now preferred form of the cutting apparatus, a rotary band saw blade 100 is held in an upper guide 102 and a lower guide 104, FIG. 7. As best shown in FIG. 10, the guides each have a hard carbide guide insert 106 which is offset rearwardly of the center of rotation 107 of the guides 102 and 104 and is spaced along the diameter a distance "$r$" from the axis of rotation such that the cutting edge of the blade moves about the axis of rotation at the same distance as the cutting surface of the deburring tool 190 moves about its axis of rotation (FIG. 9). Two sets of timing belt drive gears 110 are driven by a servo motor 112 to simultaneously rotate the upper and lower guides 102 and 104. Rotation may be obtained in this manner from a central blade position shown in FIG. 9 in solid lines to either of two 90° positions on either side of the central blade position. If desired, further rotation may be provided being limited only by the structural capability of the blade 100. As an alternative, of course, the entire band saw machine 28 can be rotated about the axis 107.

Figure 11:
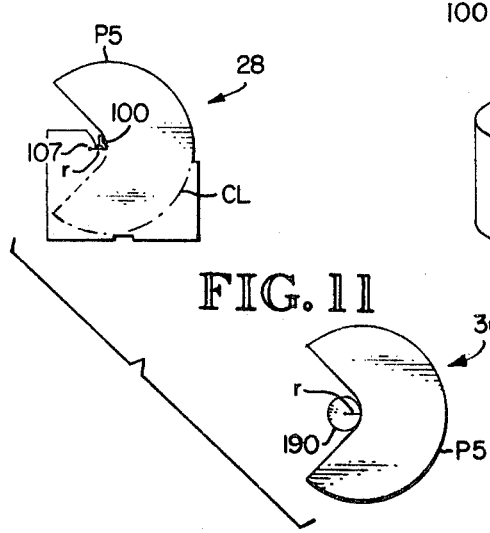
FIG. 11 is a schematic operational view illustrating an offset cutting blade pivot arrangement used with a cylindrical deburring tool.

The purpose of the offset position of the cutting blade being correlated to the radius of the deburring tool 190 is best explained with reference to FIG. 11 in which two parts are shown as they would be simultaneously moved at the cutting and deburring stations 28 and 30. As readily apparent the cylindrical deburring tool 190 has a deburring surface which is spaced a distance "$r$" from the axis of rotation of the tool 190. Thus if the part P5 has a radius to be cut equal to the radius "$r$" of the deburring tool, the part P5 must be halted. The cutting blade 100 however, must still traverse the radius of the part. This is accomplished while the part is held stationary by merely rotating the blade by numerical control about the axis 107. Since the distance "$r$" is the same for the blade and the deburring tool, rotation of the blade will follow the desired radius of the part. When the radius has been cut, simultaneous movement of the part at the deburring and cutting stations will continue.

As an alternative the deburring tool can be a second fine toothed band saw blade having a point contact with the part identical to that of the cutting blade 100. In such case the axis of rotation of both blades can be exactly at the cutting edge of each blade in a manner illustrated in more detail with reference to FIGS. 8, 12 – 15.

Air Cushion Edge Support

It is desirable when working with most thicknesses of sheet material to support the part immediately in the vicinity of the cutting blade. It is also desirable to allow, however, free planar movement of the part to incorporate the peripheral contouring principles of this invention. For this purpose, a fixed upper air cushion pad 115 and an identical fixed lower pad 116 are provided respectively on the guides 102 and 104. The guides 102 and 104 are rotatably mounted within the pads. The guides, gears and pads are provided with an aligned slot 117 to allow removal of the blade. Each of the pads is provided with air cushioning ports 118 in a well known manner which are distributed throughout the surfaces of the pads exposed to the part P. An air line 120 distributes air from a pump, motor and tank 121 to the ports 118. Adjustable pressure restriction valves 123 and 124 regulate the air pressure to the pads. A shut-off valve 122 controls the flow of air to the pads. Similarly a shut off valve 125 and a pressure restricting and directional valve 126 are provided in a line 127. Line 127 connects to either a line 127a or 127b which go to a cylinder on either side of a piston 128. A piston rod connected to piston 128 connects to pad 115 to raise and lower the pad.

As can be readily seen, air pressure on the piston 128 will urge the upper pad 115 down against the part P. Air pressure in the ports of pad 116 will tend to raise the part and provide an air cushion on the top of the part to dampen vibrations caused during cutting. The air cushion thus allows free movement of the part in a planar direction while supporting it against movement in a vertical direction. Obviously to accomplish this a balance is required between the air pressures at the piston 128 and the ports in pads 115 and 116. This balance will depend to a large extent on the weight of the part unsupported by the chuck 26, the cutting force and the size and number of ports. Assuming an unsupported weight of 15 lbs. for a part P1, and using generally available shop air pressure of 100 psi, a restriction valve 125 for reducing the pressure to 40 psi and a piston size of 1 square inch can be used. Thus the downward force on P1 is 15 lbs. plus 40 lbs. or 55 lbs. Valve 124 is then adjusted to provide an air pressure greater than 55 lbs. plus the force derived by the cutting blade passing through the material. It is estimated that a pressure of 75 psi or greater (greater air pressure in the lower pad will merely lift the part higher, thus increasing the space between the part and the ports, to reduce the lifting force on the part) is sufficient in the pad 16 for the example given to hold the part off the surface of the pad 116. The air pressure in pad 115 can be shop pressure of 100 psi since its cushioning force is automatically limited by the 40 lbs. applied by piston 128. That is, the height of the pad above the part P will vary depending on the balance between the pressure on piston 128 and the pressure exerted by air from pad 116. As is well known, the air cushion force is also controlled by the position of the pad from the part and thus a balance will continually be sought while fully supporting the part. While this unique air cushion suspension system advantageously enhances the freedom of the cutting action, it should be understood that conventional supports used with band saw machines may also be provided.

Combined Cutting And Part Movement

Figure 3:
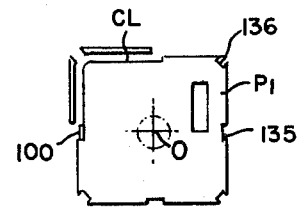
FIG. 3 is a plan view of one typical part that can be made from the apparatus shown in FIG. 1.

The servo motor 112 for changing the angular attitude of the blade 100, the servo motor 72 for changing the angular orientation of the part, and the servo motor 58 for changing the linear position of the part are all simultaneously operated preferably by computerized control such that the part will be cut along a peripheral shape. The ability to change the angular attitude of the blade 100 and provide rotation of the part greatly reduces the amount of linear translation necessary to cut a peripheral contour on the part, especially for full sheets W several feet in length and width, for example, or more commonly smaller parts P of several inches in size, length and width. As is best shown in FIG. 3, the part P1 is provided with notches 135 made during the punching operation to allow the waste material to fall free of the part at spaced intervals around the periphery of the part. Additional notches 136 may be provided for relief at sharp corners on the peripheral shape to assure that the blade 100 has ample freedom for its rear surface to negotiate the sharp turns. In general, the blade 100 will have little interference since the conventional band saw blade has its teeth set apart a distance "T" which allows freedom for the rear of the blade to move a distance "t" without interfering with the part. The notches 136, of course, eliminate any interference for radically sharp turns. As is readily apparent, movement of the cutting blade into or between the phantom line positions shown in FIG. 11 results in a change in the cutting angle relative to the cutting line CL on the periphery of the part without a substantial change necessary in the position of the part. Thus where the blade 100 follows a cutting line CL on a part P (FIGS. 3 and 14) and approaches a point "1" (FIG. 14) it is readily apparent that as point "1" on the cutting line approaches the cutting blade 100 it will be unnecessary to rotate the part substantially 90°, as in previous practice, in order to change the direction of the cutting line but rather the part can be moved a short distance simultaneously with pivoting of the cutting blade to make the change in cutting direction.

It should be understood that the unique rotary band saw concept of cutting a peripheral shape on a part or worksheet advantageously employs state-of-the-art cutting apparatus. The contouring apparatus, however, can also advantageously be used with rotary routers, slitter, lasers and other well known sheet material cutting tools, some of which may not require the blade orientation feature of the preferred embodiment herein described.

FIGS. 8 and 12 – 15 similarily describe a modified contouring apparatus but contain the same basic principles as in the preferred embodiment. In this modified form the cutting blade 100 is held in more simplified rotary guides 140 and 142. The attitude of the guides is controlled by timing belt driven gears 144 powered by a worm 146 and servo motor 148. A part P, as in the preferred embodiment is held in a contouring apparatus 150 having a single upper arm 152. The upper arm 152 is provided with a rotary sleeve 154 that houses a piston 156. The lower end of the piston is connected to a clamp plate 158 centering pins 160. In this embodiment the part P will be provided with centering or pilot holes 162 that will be punched at the punch press 10. In the lower part of the contouring apparatus 150 the arm 152 is rigidly secured to a movable carriage 164. The carriage slides in guides 166 and is powered by a rack and pinion mechanism 168 by a servo motor 170.

The movable carriage 164 is also provided with a rotatably mounted plate 172 which has corresponding openings 174 for receiving the pins 160. The lower plate 172 is rotated by a gear 176 and servo motor 178. Controls 179 and 180 simultaneously control the servo motors 170, 178 and 148 for providing the simultaneous linear and rotational movement of the part P with the angular attitude change of the blade 100.

In this embodiment tough carbide inserts 182 are offset only slightly from the central axis of rotation 108 of the guides to allow the inside cutting edge of the blade to pivot about the axis 108. Also as in the preferred embodiment slots 184 are provided in the upper and lower guides similar to the slots 117 to allow removal and replacement of the blade.

Deburring Apparatus

Figure 4:
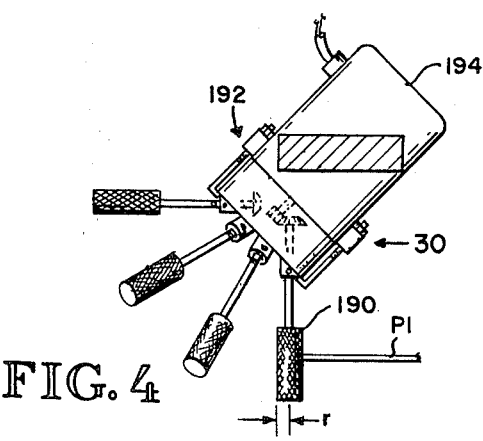
FIG. 4 is a vertical section of a portion of a deburring tool shown in the apparatus in FIG. 1.

The deburring apparatus 30 is best shown in FIGS. 1 and 4 and includes a conventional deburring tool 190 such as a rotary abrasive disk or fine toothed rotary routing type cutter 190. The cutters are mounted on a turret 192 and are powered by a motor 194.

OVERALL METHOD AND OPERATION OF APPARATUS

Known techniques for providing a manual input into computerized controls for this invention are provided for operating this invention. Similarily various automated computer inputs may be adapted for automatically providing the input and will be readily apparent to one skilled in the art. Computerized controls for the output of the machine are already used in some forms of cloth cutting such as described in U.S. Pat. Nos. 3,610,081 or 3,511,124. Such controls are adaptable by one skilled in the art for use in the computerized control of this invention. If desired, it is also well within the skill of the art to provide a manually controlled consul from which all of the operations can be remotely but manually controlled by one or more operators.

While the preferred embodiments of the invention and various inventive features of the invention have been illustrated and described, it should be understood that modifications and variations to each of them will be apparent to one skilled in the art without departing from the principles herein.

The embodiments of the invention in which a particular property or privilege is claimed are defined as follows:

1. Cutting apparatus for self-formsustaining sheet material worksheets, comprising at least one endless blade having a cutting edge, powered means for pivoting the cutting edge about an axis that is parallel to the length of the blade at its cutting location, means within the perimeter of a worksheet for positioning the worksheet relative to said cutting edge including worksheet moving means for simultaneously rotating and linearly translating the worksheet for presenting the perimeter of the worksheet to the cutting edge of the blade to cut around an internal part, and means coordinating the movement of said cutting edge pivoting means and said worksheet moving means to cut irregularly shaped parts within said worksheet.

2. The apparatus of claim 1, said blade lying in a plane at right angles to a radius drawn through said pivot axis and having the forward face of said cutting edge lying on said radius, said blade being spaced from said pivot axis a predetermined distance so that movement of the blade about said axis causes said cutting edge to cut an arc, said blade guides including axially spaced, rotary, slotted sleeve means for receiving said blade, said blade guides being secured in said slots of said sleeve means in positions such that the lateral side of said cutting edge of the blade is coincident with the axis of rotation of said sleeve means at said cutting plane, and worksheet supporting means surrounding said guide means.

3. The apparatus of claim 1, said blade edge having a lateral side coincident with said pivot axis of rotation of said cutting edge.

4. The apparatus of claim 1, said worksheet positioning means including a carrier and a worksheet clamp on said carrier, said worksheet moving means including first powered drive means for rotating said clamp and second powered drive means for moving said carrier linearly toward and away from said cutting axis, said clamp including first and second members movable toward each other for pressing the worksheet therebetween and pilot means extending between said members for aligning the worksheet therebetween.

5. Band saw cutting apparatus having an endless blade with a cutting edge having a length passing through a cutting location, guide means for supporting said cutting edge at said cutting location, powered means for pivoting said cutting edge about a pivot axis that is in lengthwise alignment with the length of the blade cutting edge at its cutting location and powered means for positioning a worksheet relative to said cutting edge, said worksheet positioning means including means for simultaneously rotating and linearly moving said worksheet in a plane perpendicular to said cutting edge.

6. The cutting apparatus of claim 5, said means for pivoting the cutting edge including means for rotating said guide means and including air cushion support means above and below said workpiece around said guide means for supporting the workpiece and dampening vibrations caused by cutting.

7. The cutting apparatus of claim 6 said air cushion support means including lower air cushion means spaced closely below the worksheet for providing an upwardly directed cushion of air for lifting the worksheet, upper air cushion means spaced closely above the worksheet for providing a downwardly directed cushion of air for urging the worksheet downwardly toward the lower air cushion means.

8. The cutting apparatus of claim 7 said air cushion support means further including means for moving said upper and lower air cushion means apart for receiving a workpiece therebetween, said moving means including a piston, an air source coupled to act on said piston and air control means for balancing the air on said piston with the air in said air cushion means to automatically adjust the air cushioning pressures provided by the upper and lower air cushioning means.

9. The cutting apparatus of claim 8, said moving means including a piston rod secured to said upper air cushion means including a piston rod secured to said upper air cushion means and to said piston, said piston fitted within a cylinder and being sized to provide a downward force on said upper air cushion means, the air pressure in said lower air cushion means being sufficient to slightly overcome the combined sum of weight of the unsupported portion of the worksheet, plus the downward cutting force of the band saw blade, plus the downward force of said piston rod.

10. The cutting apparatus of claim 5, said pivot axis and said cutting edge along its length at said cutting location being coincident.

11. The cutting apparatus of claim 5, said cutting edge along its length at said cutting location being laterally spaced from said pivot axis, said blade having a lengthwise plane lying perpendicularly to a plane passing through said pivot axis.

* * * * *